Figure 1:
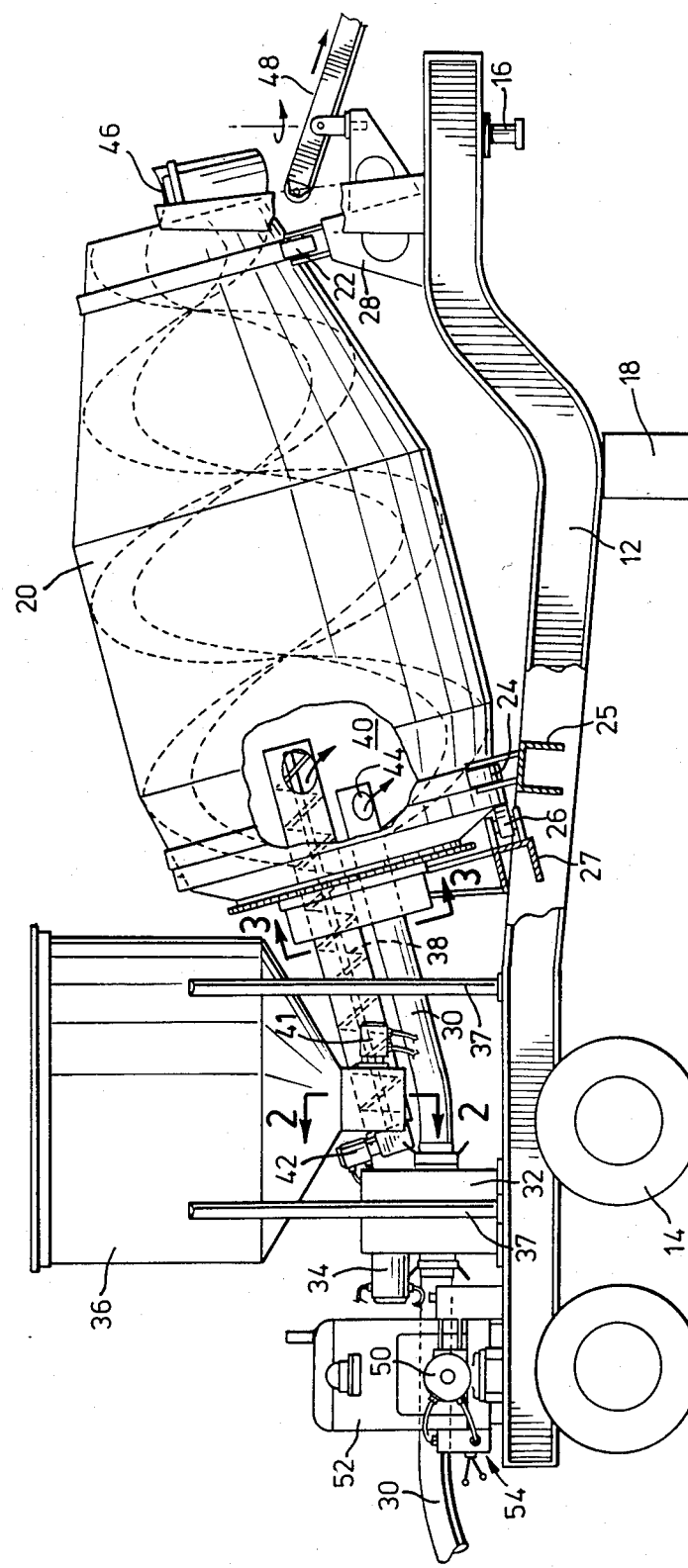

United States Patent [19]

Van Wyngaarden

[11] Patent Number: 4,487,507
[45] Date of Patent: Dec. 11, 1984

[54] PORTABLE WASTE PROCESSING UNIT

[75] Inventor: George Van Wyngaarden, London, Canada

[73] Assignee: London Machinery Company Limited, London, Canada

[21] Appl. No.: 545,455

[22] Filed: Oct. 26, 1983

[51] Int. Cl.³ .......................... B28C 7/00; B28C 7/04
[52] U.S. Cl. ........................................ 366/20; 366/29;
366/35; 366/49; 366/59; 366/61; 366/132;
366/134; 366/135; 366/163; 366/175; 366/227;
366/606
[58] Field of Search ...................... 366/20, 35, 37, 38,
366/29, 57, 59, 63, 156, 153, 163, 160, 161, 177,
180, 181, 225, 227, 228, 606, 33, 41, 49, 61, 132,
134, 135, 175, 176, 186, 233

[56] References Cited

U.S. PATENT DOCUMENTS

| 787,441 | 4/1905 | Embleton | 366/35 |
| 3,402,805 | 9/1968 | Spellman, Jr. | 366/606 X |
| 4,201,484 | 5/1980 | Sasiela et al. | 366/153 |

Primary Examiner—Timothy F. Simone
Attorney, Agent, or Firm—Fetherstonhaugh & Co.

[57] ABSTRACT

A processing apparatus for sludge and liquid waste comprising a wheeled vehicle having a frame, a drum type mixer mounted for rotation on said frame, motive power means including a hydraulic pump, a hydraulic motor for rotating said drum type mixer mounted on said frame operable in response to output from said hydraulic pump, waste feed means mounted on said frame, a hydraulic motor for said waste feed means on said frame operable in response to the output of said pump for feeding waste into the input end of said mixer, storage means on said frame for storing a supply of processing agent for said waste, processing agent feed supply means on said frame a hydraulic motor for said processing agent feed means on said frame operable in response to output of said pump for feeding processing agents from said storage means to said mixer, delivery means mounted on said frame for delivering output from said drum type mixer for conveyance to a remote location, valve control means for supplying output of said pump to said hydraulic motor for said waste feed means, valve control means for supplying output of said pump to said hydraulic motor for said processing agent feeding means, valve control means for supplying output of said pump to said hydraulic motor for said drum type mixer.

1 Claim, 3 Drawing Figures

PORTABLE WASTE PROCESSING UNIT

This invention relates to processing apparatus for sludge and liquid waste.

The processing of sludge and liquid waste such as sewage, industrial waste, and biological deposits, by mixing the waste with solidification and/or stabilization agents in a drum mixer and then discharging the stabilized waste for deposit in a dump is well known. Stabilization and solidification is achieved through the addition of processing agents such as lime, cement, fly ash, wood chips and the like.

The equipment includes a drum type mixer through which the waste is passed. As it passes through the mixer, it is mixed with solidification, stabilization or bulking agents and on discharge from the mixture is transported to a dump. Common practice is to locate a mixer and its associated power requirements at a convenient location and to transport the waste to the unit for processing. The system is a relatively costly one to operate because the sludge or liquid waste must be transported from its original location to the processing equipment. This is expensive and also inconvenient in the sense that the supply may be intermittent because of transportation problems. Transportation of the unprocessed waste often involves obnoxious ordors and special equipment.

The unit of this invention is moveable to the waste site. According to the invention, all of the essential parts of a waste processing system are mounted on a common wheeled frame that can be conveniently transported to the location of the waste where it can be continuously fed by the waste supply until all of the waste has been processed. The advantages of having all of the component parts and their power requirement mounted on a single frame so that they can be vehicle transported to any location greatly simplifies the processing of such wastes. For example, there may be a body of sludge at the bottom of a pond. With this invention that sludge can be processed on site, and economically. To transport the sludge by container truck to a remote location would be costly, cumbersome and would give rise to environmental contamination problems.

A processing apparatus for sludge and liquid waste according to the present invention comprises a wheeled vehicle having a frame, a drum type mixer mounted for rotation on said frame, motive power means including a hydraulic pump, a hydraulic motor for rotating said drum type mixer mounted on said frame operable in response to output from said hydraulic pump, waste feed means mounted on said frame, a hydraulic motor for said waste feed means on said frame operable in response to the output of said pump for feeding waste into the input end of said mixer, storage means on said frame for storing a supply of processing agent for said waste, processing agent feed supply means on said frame a hydraulic motor for said processing agent feed means on said frame operable in response to output of said pump for feeding processing agents from said storage means to said mixer, delivery means mounted on said frame for delivering output from said drum type mixer for conveyance to a remote location, valve control means for supplying output of said pump to said hydraulic motor for said waste feed means, valve control means for supplying output of said pump to said hydraulic motor for said processing agent feeding means, valve control means for supplying output of said pump to said hydraulic motor for said drum type mixer. The invention will be clearly understood after reference to the following detailed specification read in conjunction with the drawings.

In the drawings:

FIG. 1 is a side illustration of a processing unit; and

Figure 2:
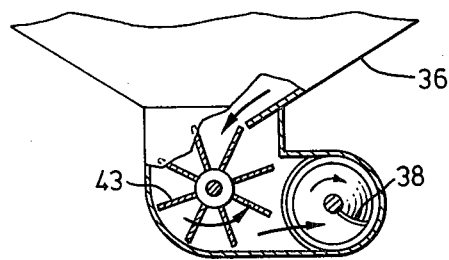
Figure 3:
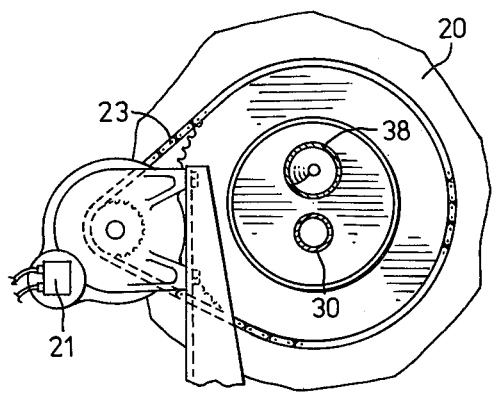

FIGS. 2 and 3 are views along the lines 2—2 and 3—3 respectively of FIG. 1.

In the drawings there is illustrated a processing apparatus for sludge and liquid which comprises a wheeled main frame, a longitudinal eye-beam member of which is indicated by the numeral 12. It will be appreciated that the frame is a standard trailor frame that has longitudinal side members similar to the member 12 and laterally extending cross members. The general construction of these frames is well known and not part of this invention so that further illustration of the frame construction is not thought necessary apart from to note that it has wheels 14 and a pin 16 for a standard fifth wheel connection whereby it can be hitched to a trailer for transport from one location to another. When not attached to the trailer it is temporarily supported in the position illustrated by means of a support 18.

A mixer drum 20 of standard design is mounted for rotation on support rollers 22, 24 and 26. Rollers 22 and 24 are repeated on the opposite side of the drum and cradle the drum therebetween according to standard roller practice in the mounting of mixing drums of this type. Thrust support roller 26 mounted on cross support 27 gives the drum its axial support. This also is in accordance with normal rotational mounting practice for these drums. The rollers 24 are supported on a cross member 25 of the frame while the rollers 22 are mounted on a support 28 that extends from a cross support at the forward end of the frame.

As indicated in the preamble to the specification, liquid waste often in the form of a sludge is pumped into the mixer through the supply conduit 30 by the sludge pump unit generally indicated by the numeral 32 which is driven by the hydraulic motor 34.

In the processing of the sludge in the mixer drum it is necessary to add a processing agent such as lime, cement, wood chip or the like and the processing agent is supplied from a hopper 36 that is mounted on the vehicle frame 12 between support posts 37. A screw conveyor 38 feeds the processing material from the hopper 36 and delivers it to the interior of the drum as at 40. A hydraulic motor 42 drives the feed conveyor 38 that feeds the processing material to the drum. A motor 41 rotates the feed paddles 43 to move material to the conveyor 38. Thus, hydraulic motor 34 drives sludge pump 32 to deliver sludge through the intake pipe 30 as at 44 and hydraulic motor 42 drives conveyor 38 to supply processing materials to the mixer. The sludge and processing materials are mixed according to the process determined by the processing engineer and after mixing and processing the mixed materials are delivered from the mixer chute 46 to a conveyor 48 for delivery to a vehicle for transport to a remote location. Mixer drum 20 is rotated by hydraulic motor 21 through chain drive 23 according to standard practice.

The hydraulic motors 21, 42, 41 and 34 are each supplied with hydraulic fluid under pressure from the hydraulic pump 50 which is operated by a diesel or like engine 52. Control valves generally indicated by the numeral 54 control the supply of hydraulic liquid as required to the operating hydraulic motors 21, 34, 41 and 42.

All of the operating parts thus arranged on the wheeled vehicle are operated and properly driven by the engine 52 and the control valves 54 for the pump 50 that supply power as required to the hydraulic motors to perform the appropriate feed speeds of the sludge and of the processing chemical to the interior of the drum which is also rotated by a hydraulic motor 42 under control of hydraulic fluid from the hydraulic pump 50. Thus, all power is basically derived from the diesel or like engine 52 and controlled by control valves of pump 50 to achieve any desired combination of feed speeds and mixing speed.

The invention is not concerned with a particular sludge control process because the particular proces is a matter of the nature of the sludge and the chemical treatments employed thereon. The sludge and treatment materials, however, must be mixed and added together at appropriate speeds and in appropriate quantities. This device is able to do these prescribed things in a very efficient manner and with the parts being arranged on a common frame that can be simply transported to any location. Quick and easy operation can be produced where demanded.

For example, the device can be wheeled into a contaminated settling pool that is bottom covered with sludge. The pool intake pipe 30 is merely lowered to the bottom of the pool. The sludge is pumped out at the required speed, mixed with processing chemical and rotated in the drum at a speed that will achieve the required dwell time and then dumped through the chute 46 onto the conveyor for transport to a remote location. The combining of the mixing and processing facilities in a single unit in this way greatly simplifies the overall sludge processing operation. Embodiments of the invention other than the one illustrated will be apparent to those skilled in the art and it is not intended that the specification should be read in a limiting sense.

What I claim as my invention is:

1. A processing apparatus for sludge and liquid waste comprising:
    a wheeled vehicle having a frame;
    a drum type mixer mounted for rotation on said frame;
    motive power means including a hydraulic pump;
    a hydraulic motor for rotating said drum type mixer mounted on said frame operable in response to output from said hydraulic pump;
    waste feed means mounted on said frame;
    a hydraulic motor for said waste feed means on said frame operable in response to the output of said pump for feeding waste into the input end of said mixer;
    storage means on said frame for storing a supply of processing agent for said waste;
    processing agent feed supply means on said frame a hydraulic motor for said processing agent feed means on said frame operable in response to output of said pump for feeding processing agents from said storage means to said mixer;
    delivery means mounted on said frame for delivering output from said drum type mixer for conveyance to a remote location;
    valve control means for supplying output of said pump to said hydraulic motor for said waste feed means;
    valve control means for supplying output of said pump to said hydraulic motor for said processing agent feeding means;
    valve control means for supplying output of said pump to said hydraulic motor for said drum type mixer.

* * * * *